United States Patent
Ogawa (10) Patent No.: US 9,249,611 B2
(45) Date of Patent: Feb. 2, 2016

(54) ROTARY DAMPER

(75) Inventor: Masaki Ogawa, Tokyo (JP)

(73) Assignee: SUGATSUNE KOGYO CO., LTD., Tokyo (JP)

(*) Notice: Subject to any disclaimer, the term of this patent is extended or adjusted under 35 U.S.C. 154(b) by 275 days.

(21) Appl. No.: 12/810,414

(22) PCT Filed: Dec. 22, 2008

(86) PCT No.: PCT/JP2008/073276
§ 371 (c)(1),
(2), (4) Date: Jun. 24, 2010

(87) PCT Pub. No.: WO2009/081893
PCT Pub. Date: Jul. 2, 2009

(65) Prior Publication Data
US 2010/0270113 A1   Oct. 28, 2010

(30) Foreign Application Priority Data

Dec. 26, 2007   (JP) .................... 2007-334612

(51) Int. Cl.
*F16F 9/24* (2006.01)
*E05F 3/14* (2006.01)
*A47K 13/12* (2006.01)
(Continued)

(52) U.S. Cl.
CPC . *E05F 3/14* (2013.01); *A47K 13/12* (2013.01); *E05F 5/00* (2013.01); *F16F 9/14* (2013.01); *E05Y 2201/21* (2013.01); *E05Y 2201/254* (2013.01); *E05Y 2201/256* (2013.01); *E05Y 2201/266* (2013.01); *E05Y 2900/614* (2013.01)

(58) Field of Classification Search
CPC  F16F 2230/064; F16F 9/14; E05Y 2201/254; E05Y 2201/256; E05Y 2201/266; E05Y 2900/614; F16D 57/06; A47K 13/12

USPC .............. 188/295, 302, 290, 293, 294; 4/236, 4/240, 248; 16/53, 58, 303, 341
See application file for complete search history.

(56) References Cited

U.S. PATENT DOCUMENTS 5,906,010 A * 5/1999 Suzuki ............................... 4/236
6,634,033 B2 * 10/2003 Mizuno et al. ..................... 4/248
(Continued)

FOREIGN PATENT DOCUMENTS

| EP | 1 331 417 | * | 7/2003 | ................ F16F 9/14 |
| EP | 2 587 089 | * | 5/2013 | ................ F16F 9/16 |

(Continued)

OTHER PUBLICATIONS

Machine translation of JP 2001182770 A.*
Machine Translation of EP 2 587 089 (no date).*
International Search Report w/translation from PCT/JP2008/073276 dated Apr. 7, 2009 (4 pages).

*Primary Examiner* — Nicholas J Lane
(74) *Attorney, Agent, or Firm* — Osha Liang LLP (57) ABSTRACT

In a rotary damper 1 including a cam surface 3*f* formed in a lower end surface of a large-diameter portion 3*b* of a rotor 3 and including a cam surface 4*f* formed in an upper end surface of a piston 4, the cam surface 4*f* being capable of contacting the cam surface 3*f*, the cam surfaces 3*f*, 4*f* pressed to contact each other by a coil spring 9 biasing the piston 4, the piston 4 is prohibited from being moved toward the large-diameter portion 3*b* beyond a predetermined second position. Coil spring 9 does not rotationally bias the piston 4. The coil spring 9 biases the piston 4 only such that the piston 4 approaches the large-diameter portion 3*b*.

1 Claim, 10 Drawing Sheets (51) Int. Cl.
*E05F 5/00* (2006.01)
*F16F 9/14* (2006.01)

(56) References Cited

U.S. PATENT DOCUMENTS

| 7,168,134 | B2 * | 1/2007 | Minami et al. ................. 16/303 |
| 2003/0009819 | A1 | 1/2003 | Mizuno et al. |
| 2004/0131421 | A1 * | 7/2004 | Nakase et al. ................. 403/365 |

FOREIGN PATENT DOCUMENTS

| JP | 3028075 U | 8/1996 | |
| JP | 10-331894 A | 12/1998 | |
| JP | 2001182770 A * | 7/2001 | ............... F16F 9/14 |
| JP | 2004-76267 A | 3/2004 | |
| WO | 02/36984 A1 | 5/2002 | |

* cited by examiner

ROTARY DAMPER

TECHNICAL FIELD

The present invention relates to a rotary damper that limits the speed of relative rotation, at least in one direction, of two members connected to each other in a relatively rotatable fashion to a low speed.

BACKGROUND ART

This type of rotary damper generally includes a damper body including a receiving hole with a bottom portion formed therein, a rotor rotatably fitted in an opening side end portion of the receiving hole, a piston movably disposed in a portion of the receiving hole between the rotor and the bottom potion, and movement means that causes the piston to be moved according to the rotation of the rotor. Inner space of the receiving hole between the rotor and the bottom portion is divided by the piston into a first chamber and a second chamber. The first and second chambers are filled with fluid such as viscose fluid. The movement means includes a cam mechanism disposed between the rotor and the piston and a coil spring that biases the piston toward the rotor. The cam mechanism allows the piston to be moved by the coil spring toward the rotor when the rotor is rotated in one direction. On the other hand, when the rotor is rotated in the other direction, the cam mechanism causes the piston to be moved in a direction away from the rotor against a biasing force of the coil spring.

When the piston is moved toward the rotor, the viscose fluid in the first chamber flows into the second chamber. Flow resistance of the viscose fluid at this time limits the speed of rotation of the rotor in the one direction to a low speed. When the piston is moved to the other direction, the viscose fluid in the second chamber flows into the first chamber. The flow resistance at this time is kept to be negligibly small. Therefore, the rotor can be rotated in the other direction at a high speed.

When the rotary damper described above is used in a toilet, for example, the damper body is fixed to either one of a toilet body and a toilet lid and the rotor is fixed to the other. In this case, the damper body and the rotor are fixed to the toilet body and the toilet lid such that the rotation speed of the toilet lid is limited to a low speed when the toilet lid is rotated in a closing direction and the toilet lid can be rotated at a high speed when rotated in an opening direction.

When the toilet lid is rotated through about 90 degrees from a closed position and the piston is moved to a predetermined position toward the rotor, the piston becomes rotatable in the one direction. As a result, the rotor becomes rotatable together with the piston in the one direction, allowing the toilet lid to be rotated through more than 90 degrees. Moreover, the coil spring rotationally biases the piston in the one direction. Therefore, after being rotated through 90 degrees from the closed position, the toilet lid is further rotated in the opening direction by the rotational biasing force of the coil spring. The toilet lid is stopped when it is abutted against a tank disposed in the toilet (refer to Patent Document 1).

PATENT DOCUMENTS

Patent Document 1: Japanese Patent Application Publication No. 2004-76267.

SUMMARY OF INVENTION

Technical Problem

In the rotary damper disclosed in the Patent Document 1, the piston is rotationally biased by the coil spring after the piston is moved to the predetermined position toward the rotor. Accordingly, in a case where the rotary damper is disposed between the toilet body and the toilet lid, the toilet lid will be abutted against the tank by the rotational biasing force of the coil spring. The abutment of the toilet lid against the tank may cause a problem of generating a big unwanted sound.

Solution to Problem

To solve the problem mentioned above, a first aspect of the present invention provides a rotary damper including: a damper body including a receiving hole formed therein, the receiving hole including an opening in one end thereof and including a bottom portion in the other end thereof; a rotor disposed in an open end portion of the receiving hole in a rotatable but retained manner; a piston disposed in a portion of the receiving hole between the rotor and the bottom portion such that the piston is rotatable and movable in an axial direction of the receiving hole; stopper means that prohibits rotation of the piston and causes the piston to be stopped at a predetermined initial position when the piston is located between a predetermined first position and a predetermined second position; and movement means that causes the piston to be moved from the first position to the second position when the rotor is rotated in one direction from a predetermined first rotation position to a predetermined second rotation position and that causes the piston to be moved from the second position to the first position when the rotor is rotated in the other direction from the second rotation position to the first rotation position; wherein the rotary damper further comprises movement blocking means that prohibits the piston from being moved beyond the second position; the piston is released from a stopped condition caused by the stopper means and becomes rotatable between the initial position and a terminal position spaced from the initial position by a predetermined angle in the one direction when the piston is located at the second position; the movement means includes biasing means and a cam mechanism, the biasing means biasing the piston from the first position toward the second position, the cam mechanism allowing the piston to be moved from the first position to the second position by the biasing means when the rotor is rotated in the one direction from the first rotation position to the second rotation position, the cam mechanism causing the piston to be moved from the second position to the first position against a biasing force of the biasing means when the rotor is rotated in the other direction from the second rotation position to the first rotation position; and the biasing means biases the piston only such that the piston is moved from the first position to the second position.

In this case, it is preferable that the rotor and the piston include abutment portions respectively formed therein, the abutment portions abutted against each other when the rotor is rotated from the second rotation position to a third rotation position with respect to the piston located at the second position and in the initial position, the third rotation position being spaced from the second rotation position in the one direction by a predetermined angle, and that the piston is rotated from the initial position to the terminal position according to the rotation of the rotor in the one direction after the abutment portions abutted against each other.

A second aspect of the present invention provides a rotary damper including: a damper body including a receiving hole formed therein, the receiving hole including an opening in one end thereof and including a bottom portion in the other end thereof; a rotor disposed in an open end portion of the receiving hole in a rotatable but retained manner; a piston disposed in a portion of the receiving hole between the rotor and the bottom portion such that the piston is rotatable and movable in an axial direction of the receiving hole; stopper means that prohibits rotation of the piston and causes the piston to be stopped at a predetermined initial position when the piston is located between a predetermined first position and a predetermined second position; and movement means that causes the piston to be moved from the first position to the second position when the rotor is rotated in one direction from a predetermined first rotation position to a predetermined second rotation position and that causes the piston to be moved from the second position to the first position when the rotor is rotated in the other direction from the second rotation position to the first rotation position; wherein the rotary damper further comprises movement blocking means that prohibits the piston from being moved beyond the second position; the movement means includes biasing means and a cam mechanism, the biasing means biasing the piston from the first position toward the second position, the cam mechanism allowing the piston to be moved from the first position to the second position by the biasing means when the rotor is rotated in the one direction from the first rotation position to the second rotation position, the cam mechanism causing the piston to be moved from the second position to the first position against a biasing force of the biasing means when the rotor is rotated in the other direction from the second rotation position to the first rotation position; and the rotor is rotatable between the second rotation position and a third rotation position with respect to the piston in the initial position when the piston is located at the second position, the third rotation position being spaced from the second rotation position in the one direction by a predetermined angle.

Advantageous Effects of Invention

According to the first and second aspects of the present invention having the above-mentioned features, the rotor is not rotated beyond the second rotational position by the biasing force of the biasing means since the piston is not moved further beyond the second position. Therefore, when the rotational damper according to the first aspect of the present invention is used between the toilet body and the toilet lid, the problem of a big unwanted sound being generated by the abutment of the toilet lid against the tank can be prevented from occurring.

BRIEF DESCRIPTION OF DRAWINGS

FIG. 8(A) is a front view of the rotor;
FIG. 8(B) is a side view of the rotor;
FIG. 8(C) is a cross-sectional view taken along line C-C of FIG. 8(A);
and FIG. 8(D) is a cross-sectional view taken along line D-D of FIG. 8(B).
FIG. 9(A) is a front view of the piston;
FIG. 9(B) is a side view of the piston;
FIG. 9(C) is a plan view of the piston;
and FIG. 9(D) is a cross-sectional view taken along line D-D of FIG. 9(A).

REFERENCE SIGNS LIST 1 rotary damper
2 casing (damper body)
2a receiving hole
2b bottom portion
2c flat portion (stopper means)
3 rotor
3f cam surface (cam mechanism)
3i first restriction surface (movement blocking means)
3j first abutment surface (abutment portion)
4 piston
4c rotation restriction portion (stopper means)
4f cam surface (cam mechanism)
4g second restriction surface (movement blocking means)
4h second abutment surface (abutment portion)
9 coil spring (biasing means)

DESCRIPTION OF EMBODIMENTS

A best mode for carrying out the present invention will be described hereinafter with reference to attached FIGS. 1 to 15.

As shown in FIGS. 1 to 7, a rotary damper 1 according to the present invention includes a casing (damper body) 2, a rotor 3 and a piston 4.

As shown in FIGS. 1 to 7, the casing 2 is composed of a metal cylindrical body having a circular cross-sectional configuration. An inner space of the casing 2 is a receiving hole 2a. The receiving hole 2a includes an opening in one end portion thereof (upper end portion in FIGS. 1 to 7) (top-bottom direction hereinafter refers to a top-bottom direction in FIGS. 1 to 6) and includes a bottom portion 2b in a lower end portion thereof. A pair of flat portions (stopper means) 2c, 2c opposed to each other are formed in a lower end portion of an outer peripheral portion of the casing 2. The pair of flat portions 2c, 2c are symmetrically arranged with respect to an axis of the casing 2 and extend parallel to the axis of the casing 2.

As shown in FIGS. 1 to 7 and 8, the rotor 3 includes a connecting portion 3a, a large-diameter portion 3b and a small-diameter portion 3c. The connecting portion 3a, the large-diameter portion 3b and the small-diameter portion 3c all have a circular cross-sectional configuration, and are coaxially arranged from top to bottom in this order. The large-diameter portion 3b is fitted to an end portion in the opening side of an inner peripheral surface of the casing 2 in a rotatable but retained manner with the connecting portion 3a protruding upward out of the casing 2 and the small-diameter porting 3c received in the casing 2. By this arrangement, the casing 2 and the rotor 3 are rotationally connected to each other. A gap between the inner peripheral surface of the casing 2 and an outer peripheral surface of the rotor 3 is sealed with a seal member 5 such as an O-ring.

The casing 2 and the connecting portion 3a of the rotor 3 are respectively non-rotatably connected to one and the other of two members that are rotatably connected with respect to each other, such as a toilet body and a toilet lid of a toilet. In this embodiment, for the sake of convenience in the explanation, it is assumed that the casing 2 is non-rotatably connected to the toilet body and the connecting portion 3a of the rotor 3 is non-rotatably connected to the toilet lid. Accordingly, it is assumed that the casing 2 is non-rotatably fixed in position while the rotor 3 is rotatable with respect to the casing 2.

The toilet lid can be rotated through a range of about 120 degrees between a closed position in which the toilet lid is abutted against an upper surface of the toilet body and closes a top end opening of the toilet body and an open position in which the toilet lid is abutted against a tank mounted on the toilet body. Accordingly, the rotor 3 is also rotatable between the closed position and the open position. However, when the rotary damper 1 is used as an independent unit, to be more specific, when the casing 2 and the rotor 3 are not connected to either one of the two members that are rotatably connected with respect to each other, the rotor 3 is capable of rotating slightly beyond the closed position and the open position, as described later. When used in a toilet, the rotary damper 1 is arranged such that axes of the casing 2 and the rotor 3 are horizontally oriented.

The rotor 3 is rotated together with the toilet lid. Therefore, a position of the rotor 3 when the toilet lid is in the closed position is also referred to as the closed position (first rotation position), and a position of the rotor 3 when the toilet lid is in the open position is also referred to as the open position. A direction in which the rotor is rotated from the closed position to the open position is referred to as an opening direction (first direction) and a direction in which the rotor is rotated from the open position to the closed position is referred to as a closing direction (second direction).

The rotor 3 includes a through hole 3d formed on the axis thereof. The through hole 3d extends from an upper end surface to a lower end surface of the rotor 3. A valve seat 3e having an annular configuration is formed in an inner peripheral surface of the through hole 3d. The valve seat 3e is composed of a part of a spherical surface centered on a rotation axis of the rotor 3. The valve seat 3e has a concave curved surface configuration. The valve seat 3e is located in an intermediate portion of the small-diameter portion 3c in the top-bottom direction.

A pair of cam surfaces (cam mechanism) 3f, 3f are formed in a lower end surface of the large-diameter portion 3b. The pair of cam surfaces 3f, 3f are symmetrically arranged with respect to the axis of the rotor 3. Each of the cam surfaces extends in a circumferential direction through a length of about 120 degrees. The small-diameter portion 3c includes first and second transverse holes 3g, 3h formed therein. The first and second transverse holes 3g, 3h extend from an outer peripheral surface of the small-diameter portion 3c to the inner peripheral surface of the through hole 3d. The first transverse hole 3g is located at a generally same location as the cam surface 3f in the top-bottom direction (direction of the axis of the rotor 3). Therefore, the first transverse hole 3g is located above the valve seat 3e. The second transverse hole 3h is located below the valve seat 3e.

The piston 4 is received in a portion of the receiving hole 2a between the bottom portion 2b and the large-diameter portion 3b of the rotor 3 such that the piston 4 can be moved in the top-bottom direction (direction of the axis of the casing 2). The piston 4 can be moved between a first position shown in FIGS. 3 and 6 and a second position shown in FIG. 4. However, when the rotary damper 1 is used as an independent unit, the piston 4 can be moved slightly beyond the first position in a direction from the second position to the first position (downward). On the other hand, as described later, the piston 4 cannot be moved beyond the second position in a direction from the first position to the second position (upward). When the rotor 3 is in the closed position, the piston 4 is located at the first position. When the rotor 3 is rotated through a predetermined angle (standing angle of 80 to 90 degrees in this embodiment) from the closed position and reaches a standing position (second rotational position), the piston 4 is located at the second position.

The piston 4 disposed in the receiving hole 2a divides an inner space of the receiving hole 2a between the bottom portion 2b and the large-diameter portion 3b into a first chamber 6A in the bottom portion 2b side and a second chamber 6B in the large-diameter portion 3b side. The first chamber 6A and the second chamber 6B communicate with each other through the second transverse hole 3h, the through hole 3d and the first transverse hole 3g. In other words, the second transverse hole 3h, the through hole 3d and the first transverse hole 3g constitute a passage allowing the first chamber 6A and the second chamber 6B to communicate with each other. The first chamber 6A and the second chamber 6B are filled with fluid such as viscose fluid (not shown) introduced through the through hole 3d, the first transverse hole 3g and the second transverse hole 3h. An opening of the through hole 3d is sealed with a plug body 7 threaded to the opening and a seal member 8.

As shown in FIGS. 3 to 7, and 9, the piston 4 has a circular cross-sectional configuration. An outer diameter of the piston 4 is sized to be generally the same as an inner diameter of the receiving hole 2a. An upper portion of the piston 4 is slidably and rotatably fitted in a portion of the inner peripheral surface of the casing 2 that is located above the flat portions 2c. On the other hand, a pair of flat surface portions 4a, 4a extending upward from a lower end surface of the piston 4 are formed in a lower portion of the piston 4. The pair of flat surface portions 4a, 4a respectively slidably surface contact inner surfaces of the pair of the flat portions 2c, 2c of the casing 2. The piston 4 is not rotatable with respect to the casing 2 as long as portions of the flat surface portion 4a located in the opposite sides (left and right side portions in FIG. 9(A)) with respect to the axis of the piston 4 (axis of the casing 2) are contacted with the flat portion 2c.

Figure 9:
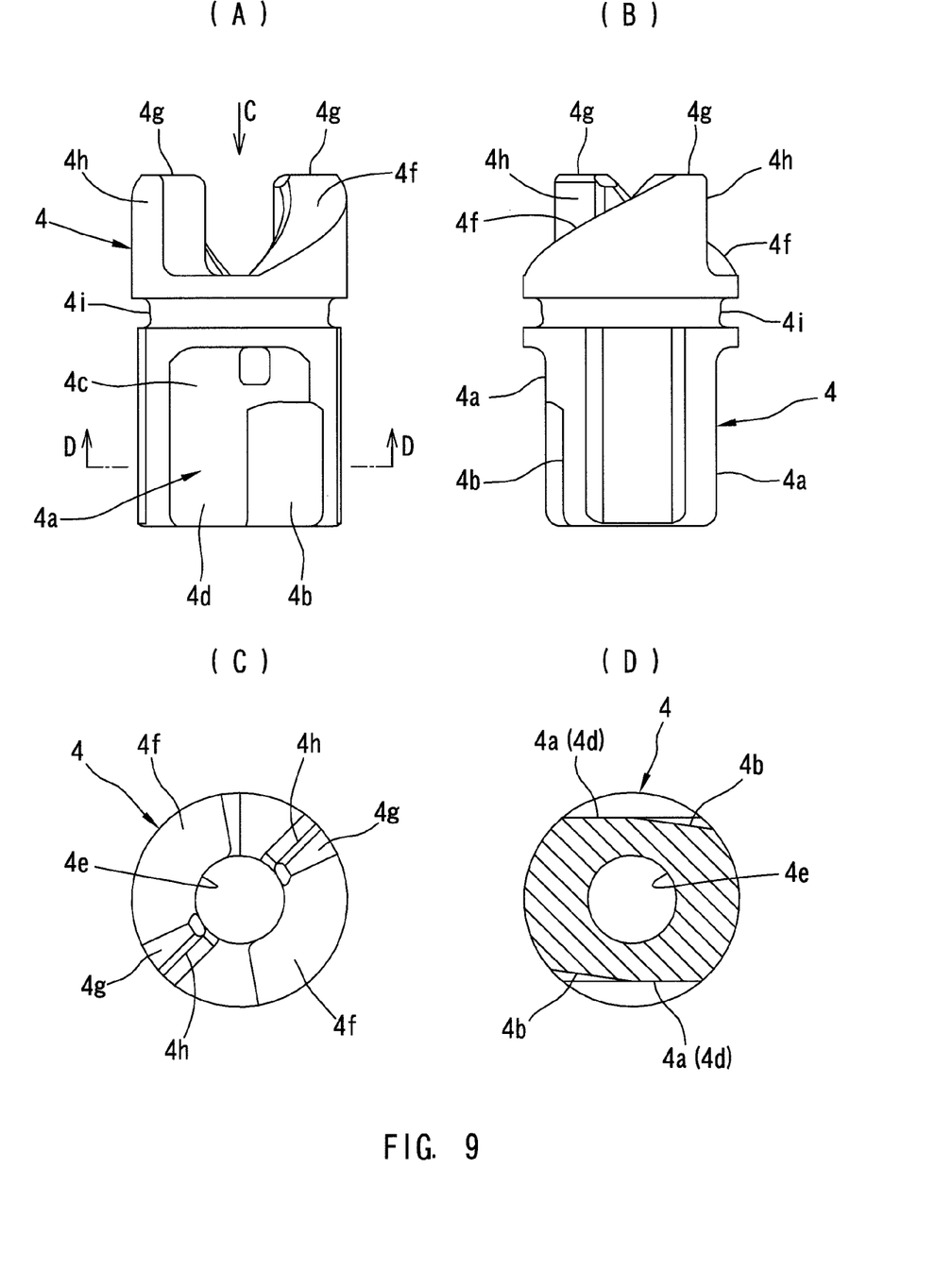
FIG. 9 shows the piston used in the embodiment.

An inclined surface portion 4b is formed in the flat surface portion 4a. The inclined surface portion 4b extends upward from the lower end surface of the piston 4. A length of the inclined surface portion 4b is shorter than a length of the flat surface portion 4a by a predetermined length. A one end (left end) of the inclined surface portion 4b in a width direction thereof (left-right direction in FIG. 9 (A)) is located at a center in a width direction of the flat surface portion 4a. In other words, the one end of the inclined surface portion 4b in the width direction intersects the flat surface portion 4a in a central portion of the flat surface portion 4a in the width direction. The other end of the inclined surface portion 4b in the width direction intersects an outer peripheral surface of the piston 4. As shown in FIG. 9(D), the inclined surface portion 4b is inclined with respect to the flat surface portion 4a such that the other end of the inclined surface portion 4b in the width direction is more spaced from the flat surface portion 4a toward the inner side of the piston 4 than the one end of the inclined surface portion 4b in the width direction.

Figure 10:
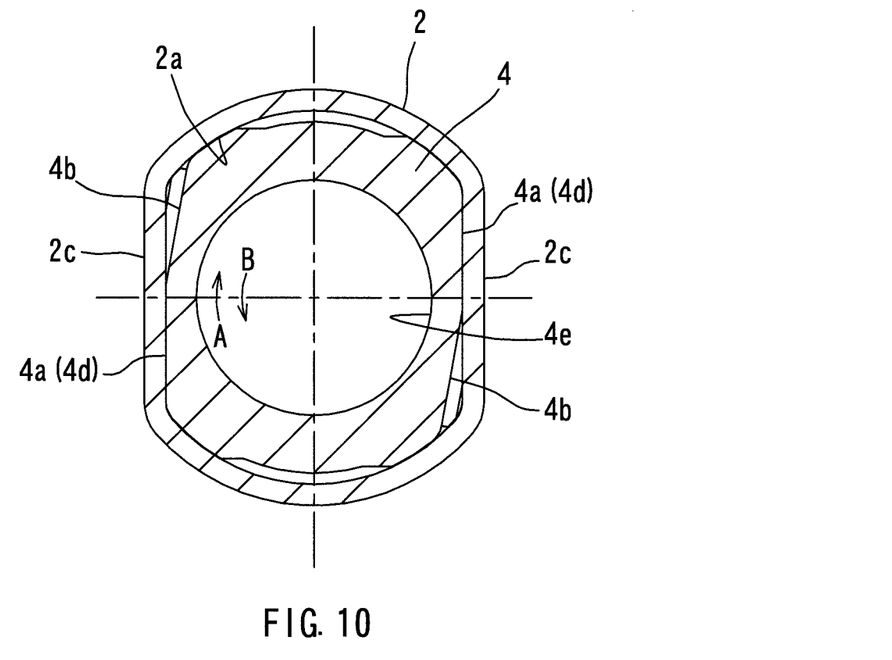
FIG. 10 is an enlarged cross-sectional view taken along line X-X of FIG. 1 with a remaining portion of a flat surface portion contacted with a flat portion.
Figure 11:
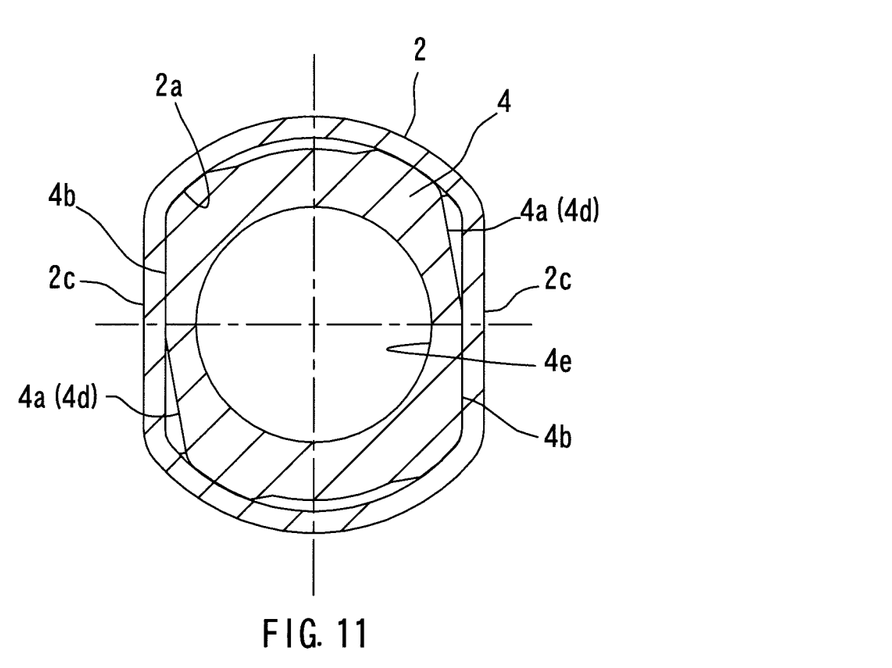
FIG. 11 is a view similar to FIG. 10 with an inclined surface portion contacted with the flat portion.

The flat surface portion 4a and the inclined surface portion 4b are contacted with and spaced from (the inner surface of) the flat portion 2c according to a position of the piston 4 in the axial direction of the casing 2 in the following manner. That is, when the piston 4 is located at the first position, a portion (referred to as a rotation restriction portion (stopper means) hereinafter) 4c of the flat surface portion 4a located above the inclined surface portion 4b is entirely contacted with the flat portion 2c in the width direction. Accordingly, when the piston 4 is located at the first position, the piston 4 is not rotatable with respect to the casing 2. The rotational position of the piston 4 at this time is an initial position. Although a contact length of the rotation restriction portion 4c with respect to the flat portion 2c in the top-bottom direction is reduced as the piston 4 is moved upward from the first position, the rotation restriction portion 4c is contacted with the flat portion 2c, thereby holding the piston 4 in a non-rotatable manner until the piston 4 reaches a position immediately before the second position. When the piston 4 reaches the second position, a lower end of the rotation restriction portion 4c generally coincides with an upper end of the flat portion 2c or is slightly spaced upward from the upper end of the flat portion 2c, and thus the entirety of the rotation restriction portion 4c is spaced upward from the flat portion 2c. In this condition, as shown in FIGS. 10 and 11, only the inclined surface portion 4b and a portion (referred to as a remaining portion hereinafter) 4d of the flat surface portion 4a other than the rotation restriction portion 4c are opposed to the flat portion 2c. Accordingly, when the piston 4 reaches the second position, as shown in FIG. 10, the piston 4 is prevented from being rotated in a direction from the remaining portion 4d toward the inclined surface portion 4b (direction of arrow A in FIG. 10) by the abutment of the remaining portion 4d against the flat portion 2c. However, as shown in FIG. 11, the piston 4 can be rotated in a direction from the inclined surface portion 4b toward the remaining portion 4d (direction of arrow B in FIG. 10) until the inclined surface portion 4b is abutted against the flat portion 2c. In other words, the piston 4 can be rotated through an inclination angle of the inclined surface portion 4b with respect to the flat surface portion 4a.

Here, the direction from the remaining portion 4d toward the inclined surface portion 4b coincides with the closing direction and the direction from the inclined surface portion 4b toward the remaining portion 4d coincides with the opening direction. Accordingly, when the piston 4 reaches the second position, the piston 4 becomes rotatable between the initial position and a terminal position spaced from the initial position by the inclination angle of the inclined surface portion 4b in the opening direction. However, even when the piston 4 reaches the second position, the piston 4 is not rotatable in the closing direction.

An insertion hole 4e is formed in the piston 4 on the axis of the piston 4 from an upper end surface to the lower end surface of the piston 4. The small-diameter portion 3c of the rotor 3 is rotatably and slidably inserted in an upper portion of the insertion hole 4e. A coil spring (biasing means) 9 is disposed in an annular space between an inner peripheral surface of the insertion hole 4e and the outer peripheral surface of the small-diameter portion 3c. A lower end portion of the coil spring 9 is abutted against the bottom portion 2b and an upper end portion of the coil spring 9 is abutted against the piston 4, thereby the coil spring 9 biasing the piston 4 toward the large-diameter portion 3b of the rotor 3.

A pair of cam surfaces (cam mechanisms) 4f, 4f are formed in an upper end surface of the piston 4 opposed to the large-diameter portion 3b. The cam surface 4f is abutted against the cam surface 3f by the biasing force of the coil spring 9. A lower end portion of the cam surface 3f is contacted with an upper end portion of the cam surface 4f when the rotor 3 is in the closed position (see FIG. 12). The piston 4 is located at the first position at this time. The cam surfaces 3f, 4f allow the piston 4 to be moved in the direction from the first position toward the second position (upward) when the rotor 3 is rotated from the closed position in the opening direction (the direction of Arrow A in FIG. 12). Accordingly, when the rotor 3 is rotated in the opening direction, the piston 4 is moved from the first position side toward the second position side by the coil spring 9. The cam surfaces 3f, 4f causes the piston 4 to be moved from the second position side toward the first position side against the biasing force of the coil spring 9 when the rotor 3 is rotated in the closing direction.

The piston 4 can be moved downward beyond the first position until the lower end surface of the piston 4 is abutted against the bottom portion 2b, according to which the rotor 3 can be rotated through a slight angle (5 degrees, for example) beyond the closed position. However, when the rotary damper 1 is used in a toilet, as mentioned above, the abutment of the toilet lid against the toilet body prohibits the rotor 3 from being rotated beyond the closed position. Therefore, the piston 4 will not be moved downward beyond the first position.

As shown in FIGS. 12 to 15, the rotor 3 includes a first restriction surface 3i formed therein. The first restriction surface 3i extends in the opening direction from a lower end of the cam surface 3f. The first restriction surface 3i is composed of a flat surface disposed at a right angle with respect to the axis of the casing 2. On the other hand, the piston 4 includes a second restriction surface 4g formed therein. The second restriction surface 4g extends in the closing direction from an upper end of the cam surface 4f. The second restriction surface 4g is composed of a flat surface disposed at a right angle with respect to the axis of the casing 2. Abutment of the first restriction surface 3i against the upper end surface of the piston 4, abutment of the second restriction surface 4g against a lower end surface of the large-diameter portion 3b of the rotor 3 or respective abutment of the first and second restriction surfaces 3i, 4g against the upper end surface of the piston 4 and the lower end surface of the large-diameter portion 3b prohibits the piston 4 from being moved further upward. The piston 4 is located at the second position at this time. Therefore, the piston 4 cannot be moved upward beyond the second position. As mentioned above, when the piston 4 is moved from the first position to the second position, the rotor 3 is rotated from the closed position through 80 to 90 degrees to reach the standing position.

The rotor 3 includes a first abutment surface (abutment portion) 3j formed therein. The first abutment surface 3j extends from a distal end of the first restriction surface 3i to the lower end surface of the large-diameter portion 3b. The first abutment surface 3j is formed at a right angle with respect to the first restriction surface 3i and faces the opening direction. The piston 4 includes a second abutment surface (abutment portion) 4h formed therein. The second abutment surface 4h extends from a distal end of the second restriction surface 4g to the upper end surface of the piston 4. The second abutment surface 4h is formed at a right angle with respect to the second restriction surface 4g and faces the closing direction. The second abutment surface 4h is arranged such that when the piston 4 reaches the second rotation position accompanying the rotation of the rotor 3 to the standing position, the second abutment surface 4h is spaced from the first abutment surface 3j by a predetermined distance in the circumferential direction (see FIG. 13). Therefore, the rotor 3 can be rotated with respect to the piston 4 in the initial position through an angle (referred to as an abutment angle hereinafter) corresponding to a distance between the first abutment surface 3j and the second abutment surface 4h from the standing position (second rotation position) in the opening direction. The rotation position of the rotor 3 when the first abutment surface 3j is abutted against the second abutment surface 4h of the piston 4 in the initial position is a third rotation position (see FIG. 14). After the abutment of the first abutment surface 3j and the second abutment surface 4h against each other, the rotor 3 can be further rotated in the opening direction together with the piston 4 through the inclination angle of the inclined surface portion 4b with respect to the flat surface portion 4a (see FIG. 15). Here, the position of the rotor 3 at this time is referred to as a maximum rotation position. The maximum rotation position is beyond the open position by slight degrees (5 degrees, for example) in the direction from the closed position to the open position. Accordingly, when the rotary damper 1 is used in a toilet, the rotor 3 is not rotated up to the maximum rotation position, stopped at a position before the maximum rotation position by a predetermined angle (This position is the open position.).

As shown in FIGS. 3 to 6, a valve body 10 is inserted in a portion of the through hole 3d located below the valve seat 3e such that the valve body 10 is movable in the top-bottom direction (longitudinal direction of the through hole 3d). The valve body 10 is movable between a closed-valve position shown in FIGS. 5 and 6 and an open-valve position shown in FIGS. 3 and 4. When the valve body 10 is located at the closed-valve position, a valve portion 10a of the valve body 10 is seated on the valve seat 3e, blocking the communication between a portion of the through hole 3d above the valve seat 3e and the portion of the through hole 3d below the valve seat 3e. As a result, the communication between the first chamber 6A and the second chamber 6B is blocked. On the other hand, when the valve body 10 is in the open-valve position, the valve portion 10a is spaced downward from the valve seat 3e. As a result, the first chamber 6A and the second chamber 6B can communicate with each other through the through hole 3d.

Movement of the valve body 10 between the open-valve position and the closed-valve position is automatically performed accompanying the rotation of the rotor 3. That is, when the rotor 3 is rotated in the opening direction and the piston 4 is moved upward accompanying the rotation of the rotor 3, the fluid in the second chamber 6B flows into the first chamber 6A through the through hole 3d. The fluid flowing downward in the through hole 3d pushes the valve body 10 downward, causing the valve body 10 to be moved to the open-valve position. On the other hand, when the rotor 3 is rotated in the closing direction, and the piston 4 is moved downward accompanying the rotation of the rotor 3, the fluid in the first chamber 6A flows into the second chamber 6B through the through hole 3d. The fluid flowing upward in the through hole 3d pushes the valve body 10 upward, causing valve body 10 to be moved to the closed-valve position.

As shown in FIGS. 3 to 6 and 9, an annular recess 4i is formed in the outer peripheral surface of the piston 4. A depth of the annular recess 4i increases progressively downward. Therefore, a bottom surface of the annular recess 4i has a tapered surface configuration with the diameter of the bottom surface reduced progressively downward. A seal member 11 such as an O-ring made of an elastic material such as rubber is disposed in the annular recess 4i. An inner diameter of the seal member 11 is sized to be smaller than a diameter of the bottom surface of the annular recess 4i at the deepest portion. Therefore, the seal member 11 is constantly pressed against the bottom surface of the annular recess 4i by its own elasticity. An outer diameter of the seal member 11 is sized such that an outer peripheral portion of the seal member 11 is protruded outward from the annular recess 4i even when the seal member 11 is disposed at the deepest portion of the annular recess 4i. Accordingly, the outer peripheral portion of the seal member 11 is protruded outward from the annular recess 4i and is press contacted against an inner peripheral surface of the receiving hole 2a by its own elasticity. By this arrangement, a gap between the outer peripheral surface of the piston 4 and the inner peripheral surface of the receiving hole 2a is sealed. A diameter of a member constituting the seal member 11 is sized to be smaller than a width (dimension in the top-bottom direction) of the annular recess 4i. Therefore, the seal member 11 can be moved through a distance corresponding to a difference between the width of the annular recess 4i and the diameter of the member constituting the seal member 11 in the top-bottom direction. The seal member 11 can be moved downward more easily than upward since the bottom surface of the annular recess 4i is tapered such that the diameter of the bottom surface is reduced progressively downward.

Figure 12:
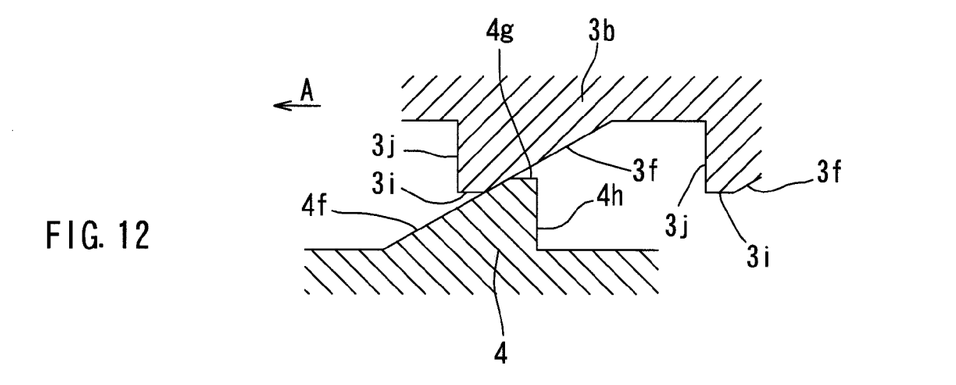
FIG. 12 is a development view of a main portion showing the relationship between the rotor and the piston when the rotor is in a closed position.

Let us assume that the toilet lid (rotor 3) is in the closed position (first rotation position) in a toilet in which the rotary damper 1 having the above-described features is used. At this time, the piston 4 is located at the first position, the valve body 10 is located at the open-valve position and the seal member 11 is located at an upper end portion of the annular recess 4i. Furthermore, as shown in FIG. 12, a lower end portion of the cam surface 3f is abutted against an upper end portion of the cam surface 4f. At this time, the toilet lid is not rotated in the opening direction by the coil spring 9 since the rational biasing force of the coil spring 9 is smaller than a rotation moment generated by an own weight of the lid in the closed position, although the toilet lid is rotationally biased in the opening direction by the biasing force of the coil spring 9 when the toilet lid is in the closed position.

When the toilet lid is manually rotated in the opening direction from the closed position, the piston 4 is moved from the first position to the second position by the coil spring 9. At this time, according to the movement of the piston 4, the fluid in the second chamber 6B flows into the first chamber 6A through the though hole 3d. The fluid flows almost without resistance since the valve body 10 is located at the open-valve position. Therefore, the toilet lid can be rotated in the opening direction easily and at a high speed.

The piston 4 can be more easily moved at the beginning of the rotation of the toilet lid from the closed position since the seal member 11 is moved relatively downward according to the movement of the piston 4. To be more specific, if the seal member 11 were disposed in the piston 4 non-movably in the top-bottom direction, the piston 4 would have to be moved against a friction resistance generated between the seal member 11 and the inner peripheral surface of the receiving hole 2a when the piston starts to be moved from the first position. Accordingly, a considerable moving resistance is generated at the beginning of the movement of the piston 4, not allowing the toilet lid to be rotated smoothly in the opening direction. However, in the rotary damper 1 of the present invention, at the beginning of the movement of the piston 4, the seal member 11 is relatively moved in the opposite direction from the piston 4, i.e. downward. Moreover, since the diameter of the bottom surface of the annular recess 4i is reduced progressively downward, the seal member 11 is moved more smoothly downward. Therefore, the piston 4 can be smoothly moved from the first position to the second position. Accordingly, the toilet lid can be smoothly rotated in the opening direction from the closed position. The seal member 11 reaches a lower end portion of the annular recess 4i while the piston 4 is moved toward the second position. In the process, the diameter of the seal member 11 is reduced according the reduction of the diameter of the bottom surface of the annular recess 4i in the lower end portion of the annular recess 4i. This reduces the friction resistance generated between the seal member 11 and the inner peripheral surface of the receiving hole 2a. Therefore, the piston 4 can be smoothly moved upward.

When the toilet lid is rotated in the opening direction from the closed position through a predetermined angle (70 degrees, for example), a rotation moment generated by the coil spring 9 and the cam surfaces 3f, 4f becomes greater than the rotation moment in the closing direction generated by the own weight of the toilet lid. Therefore, after this point, the toilet lid is automatically rotated in the opening direction to a standing position. The rotation moment generated by the coil spring 9 may be set to be always smaller than the rotation moment generated by the own weight of the toilet lid. In this case, the toilet lid should be manually rotated from the closed position to the standing position.

Figure 13:
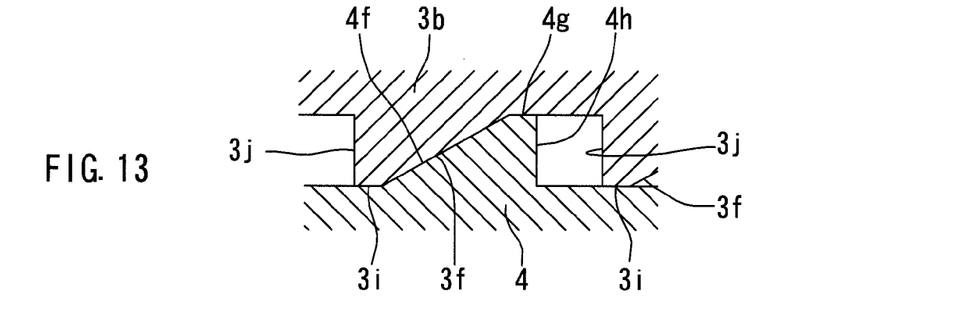
FIG. 13 is a view similar to FIG. 12 with the rotor in a standing position.

When the toilet lid (rotor 3) is rotated in the opening direction to the standing position (second rotation position), the piston 4 reaches the second position. At this time, as shown in FIG. 13, the first restriction surface 3i is abutted against the upper end surface of the piston 4 or the second restriction surface 4g is abutted against the lower end surface of the large-diameter portion 3b of the rotor 3. This prohibits the piston 4 from being moved upward, causing the rotational biasing force not to be generated by the coil spring 9. As a result, the toilet lid and the rotor 3 are stopped at the standing position. Accordingly, the toilet lid can be prevented from being rotated to the open position by the biasing force of the coil spring 9 and from being abutted against the tank. Therefore, the generation of a hitting sound can be prevented. When the toilet lid in the standing position is set free to be rotated, the toilet lid would be rotated to the closed position since the standing position is spaced from the closed position by 80 to 90 degrees. However, the rotation moment in the closing direction generated by the own weight of the toilet lid at the standing position is smaller than the rotation moment generated by the coil spring 9 and the cam surfaces 3f, 4f. Therefore, the toilet lid is prohibited from being rotated in the closing direction from the standing position by the biasing force of the coil spring 9. The toilet lid is thus held in a stopped condition at the standing position.

Figure 14:
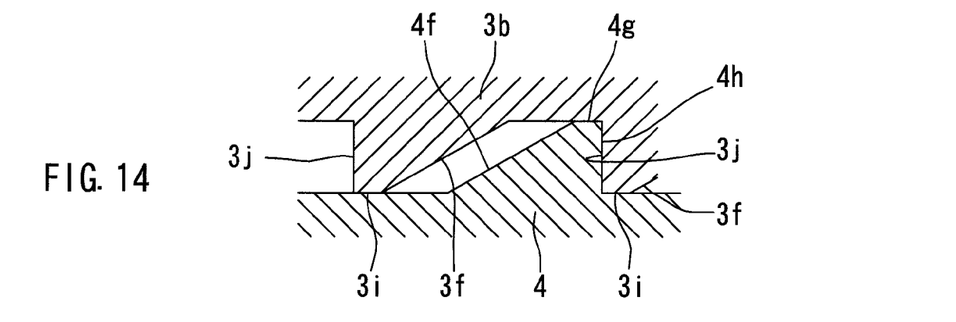
FIG. 14 is a view similar to FIG. 12 with the rotor rotated from the standing position in an opening direction through an abutment angle.
Figure 15:
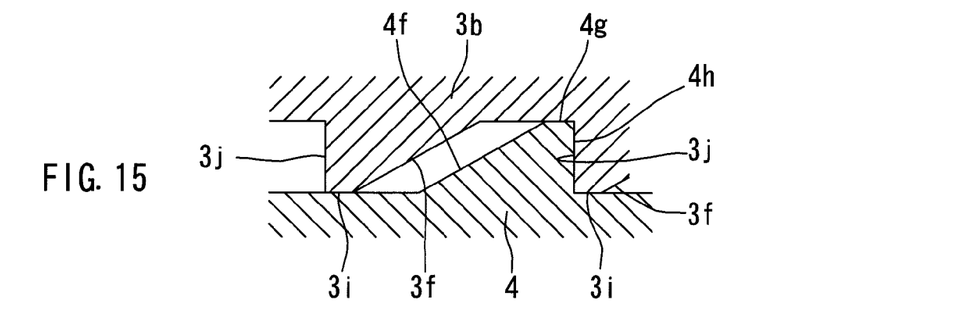
FIG. 15 is a view similar to FIG. 12 with the rotor in an open position.

The toilet lid is manually rotated in the opening direction from the standing position to the open position. When the toilet lid is rotated in the opening direction from the standing position, the rotor 3 is rotated in the opening direction. Accompanying the rotation of the rotor 3 in the opening direction from the standing position (second rotation position), the cam surfaces 3f, 4f are spaced from each other and the first and the second abutment surfaces 3j, 4h are moved closer to each other. When the rotor is rotated from the standing position through the abutment angle, the first abutment surface 3j is abutted against the second abutment surface 4h as shown in FIG. 14. Accordingly, after the abutment, the rotor 3 and the piston 4 are rotated together in the opening direction. When the toilet lid reaches the open position and stops there, the rotor 3 and the piston 4 are stopped at the open position as shown in FIG. 15. When the toilet lid is rotated in the opening direction from the standing position, the rotor 3 and the piston 4 are rotated together in the opening direction through an inclination angle of the inclined surface portion 4b. After that, only the rotor 3 may be rotated to the open position. The first and the second abutment surfaces 3j, 4h will not be abutted against each other at this time. It is because the maximum rotation position of the rotor 3 is located more to the front than the open position in the opening direction by a predetermined angle.

At least one of the first restriction surface 3i and the second restriction surface 4g are formed to prevent the toilet lid from being abutted against the tank by the biasing force of the coil spring 9. If the rotor 3 were prohibited from being rotated by the prohibition of the movement of the piston 4 by the first or the second restriction surface 3i, 4g, a rotation range of the rotor 3 would be limited. However, in the rotary damper 1, the rotation range of the rotor 3 can be wide since the rotor 3 is rotatable in the opening direction with respect to the piston 4 through the predetermined abutment angle even after the piston 4 is stopped at the second position. Moreover, when the piston 4 reaches the second position, the piston 4 can be rotated in the opening direction through the predetermined inclination angle from the initial position. This arrangement allows the rotation range of the rotor 3 to be even wider.

To move the toilet lid from the open position to the closed position, the toilet lid is first manually rotated in the closing direction from the open position. When the rotor 3 is rotated in the closing direction from the open position through a predetermined angle (abutment angle or an angle equal to the abutment angle minus the inclination angle), the cam surface 3f is abutted against the cam surface 4f. After the abutment, therefore, the rotor 3 and the piston 4 are rotated together in the closing direction to the standing position.

When the toilet lid in the standing position is further rotated in the closing direction, the piston 4 is moved downward by the cam surfaces 3f, 4f against the biasing force of the coil spring 9. Accompanying the downward movement of the piston 4, the fluid in the first chamber 6A is moved to flow into the second chamber 6B. At this time, the valve body 10 is moved upward by the fluid to be seated on the valve seat 3e. This causes the through hole 3d that serves as a passage between the first chamber 6A and the second chamber 6B to be closed. As a result, the fluid in the first chamber 6A flows into the second chamber 6B through a slight gap between the outer peripheral surface of the small-diameter portion 3c of the rotor 3 and the inner peripheral surface of the insertion hole 4e of the piston 4. The speed of the downward movement of the piston 4 is reduced by a flow resistance of the fluid passing though the gap. This causes the rotational speed of the toilet lid in the closing direction to be reduced. Moreover, when the piston 4 is moved downward from the second position by a predetermined distance, the seal member 11 is moved to the upper end portion of the annular recess 4i, strongly press-contacted with the inner peripheral surface of the receiving hole 2a. Accordingly, a big friction resistance is generated between the seal member 11 and the inner peripheral surface of the receiving hole 2a. This friction resistance also works to reduce the speed of the downward movement of the piston 4. While, in the rotary damper 1 of this embodiment, the slight gap between the outer peripheral surface of the small-diameter portion 3c and the inner peripheral surface of the insertion hole 4e of the piston 4 is used as flow resistance means against the fluid, alternatively, the slight gap may be reduced to practically zero and an orifice as a resistance passage communicating with the first and the second chambers 6A, 6B may be formed in the small-diameter portion 3c or the piston 4.

Figure 1:
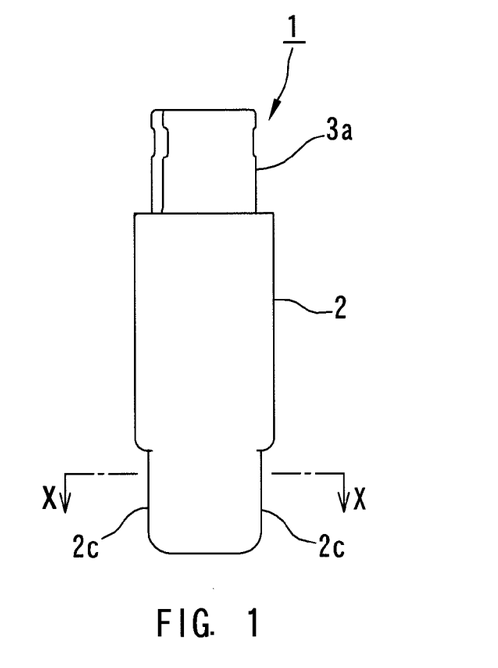
FIG. 1 is a front view of an embodiment of a rotary damper according to the present invention.
Figure 2:
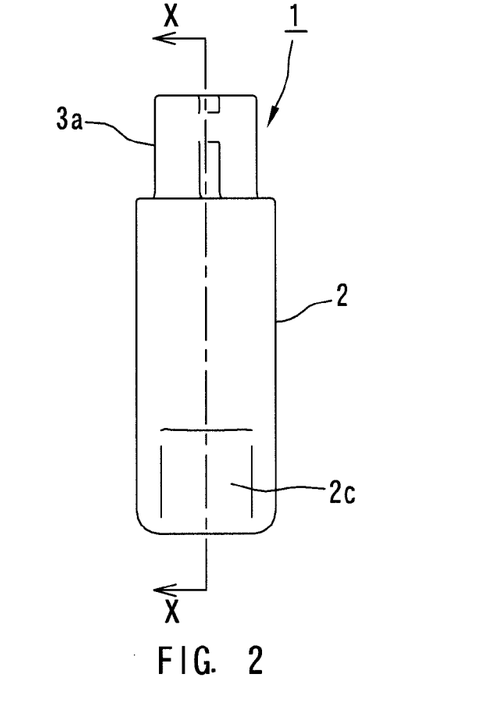
FIG. 2 is a side view of the embodiment.
Figure 3:
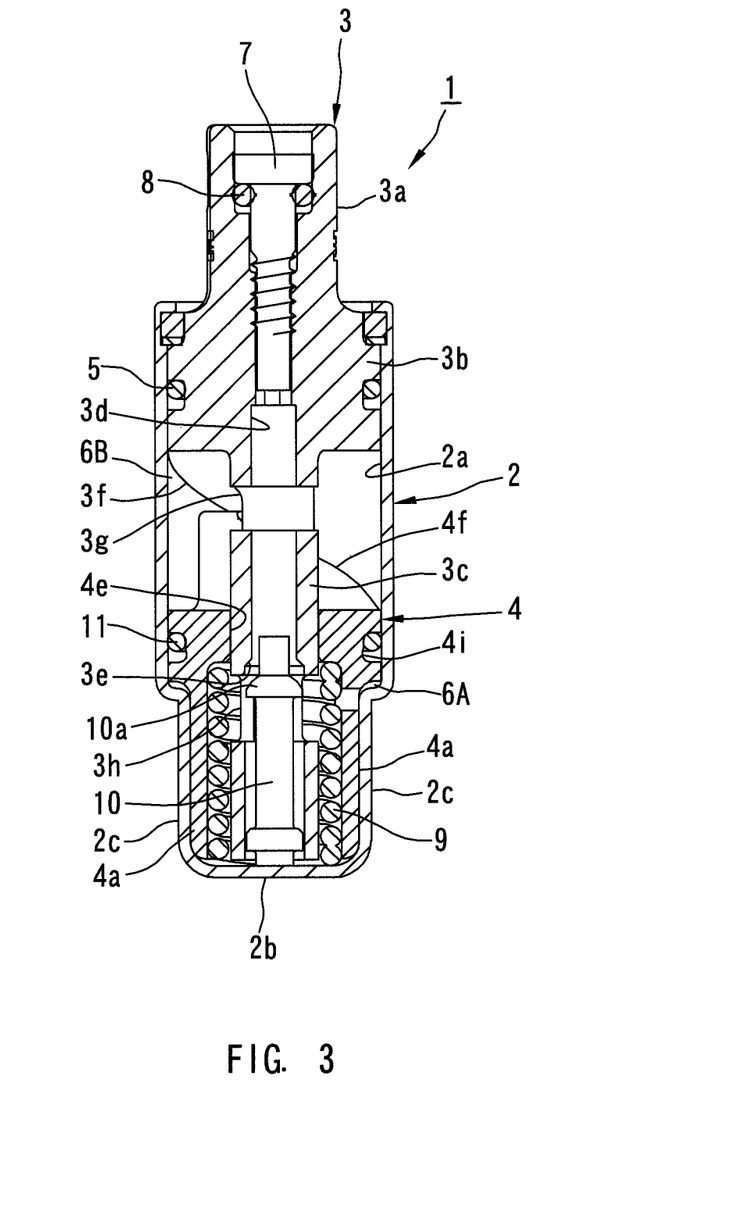
FIG. 3 is a cross-sectional view taken along line X-X of FIG. 2 showing the embodiment with a piston located at a first position and a valve body located at an open-valve position.
Figure 4:
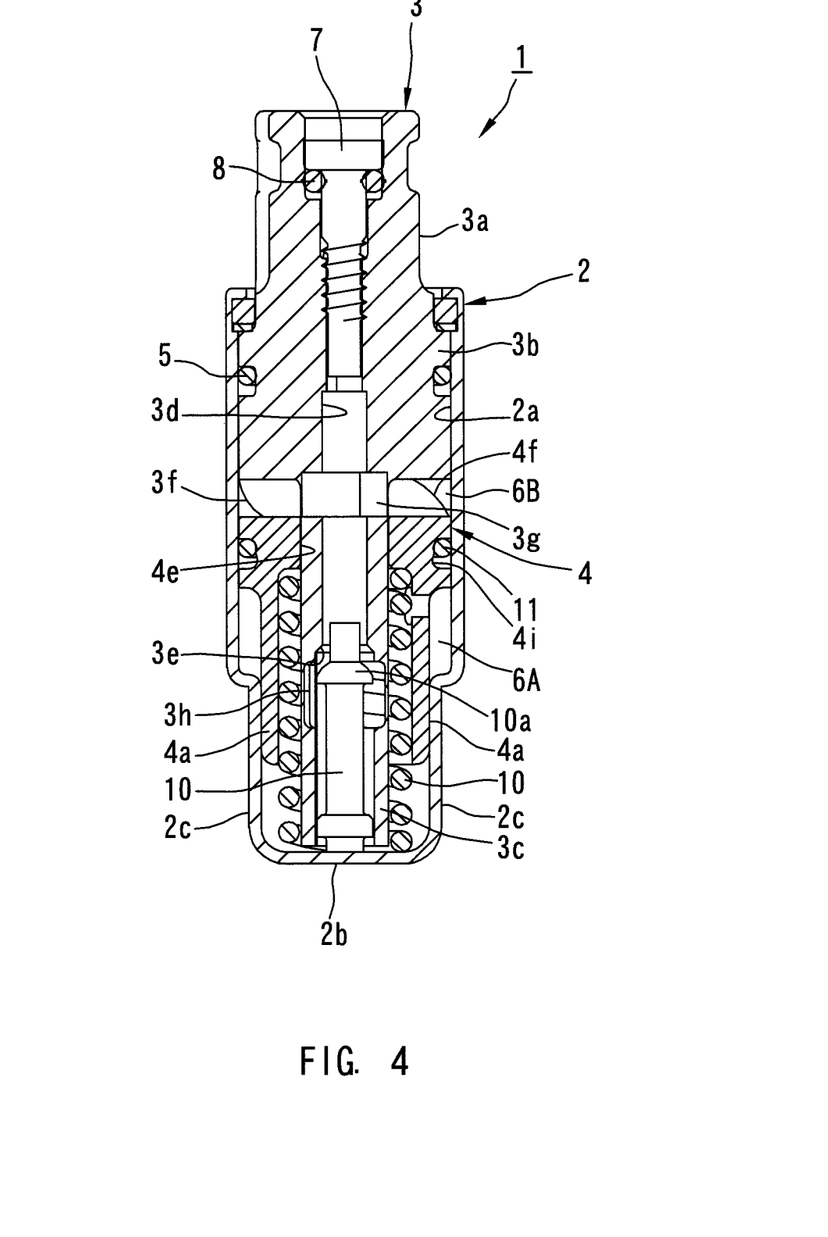
FIG. 4 is a cross-sectional view similar to FIG. 3 showing the embodiment with the piston located at a second position and the valve body located at the open-valve position.
Figure 5:
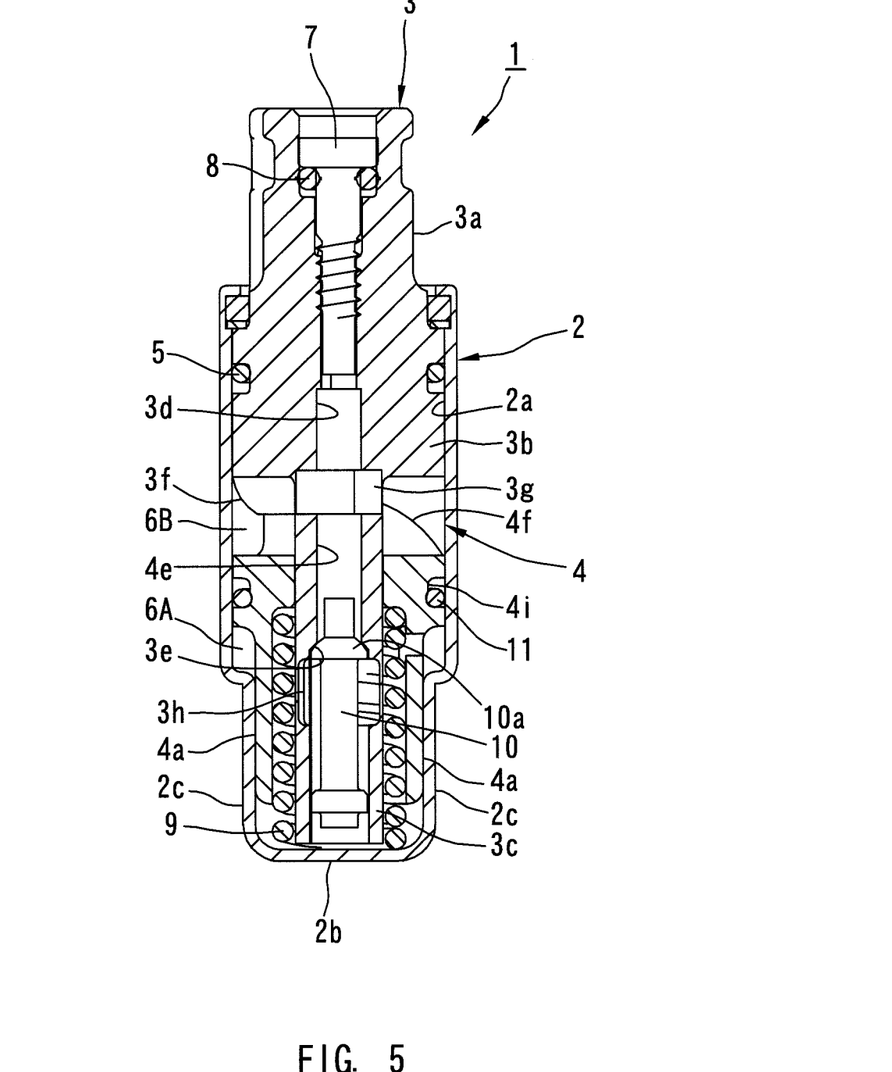
FIG. 5 is a cross-sectional view similar to FIG. 3 showing the embodiment with the piston in the process of being moved from the second position to the first position.
Figure 6:
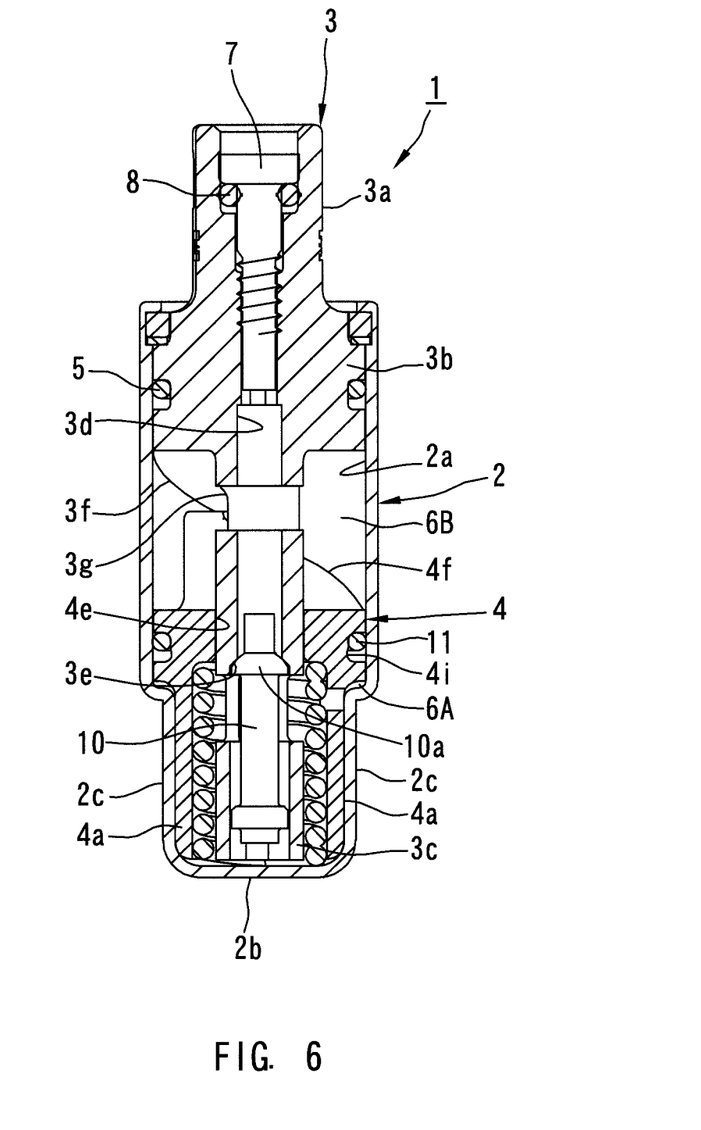
FIG. 6 is a cross-sectional view similar to FIG. 3 showing the embodiment with the piston located at the first position and the valve body located at a closed-valve position.
Figure 7:
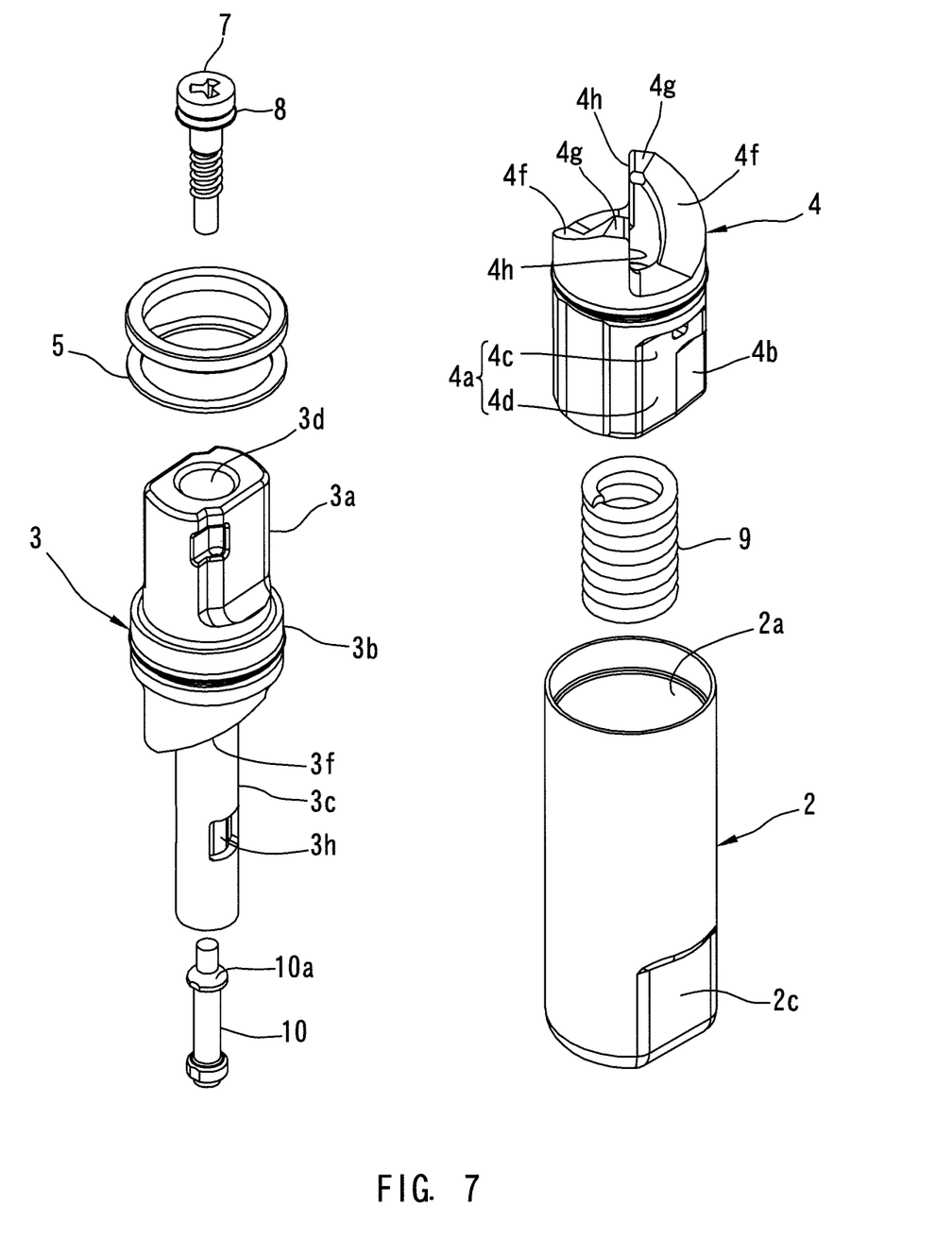
FIG. 7 is an exploded perspective view of the embodiment.
Figure 8:
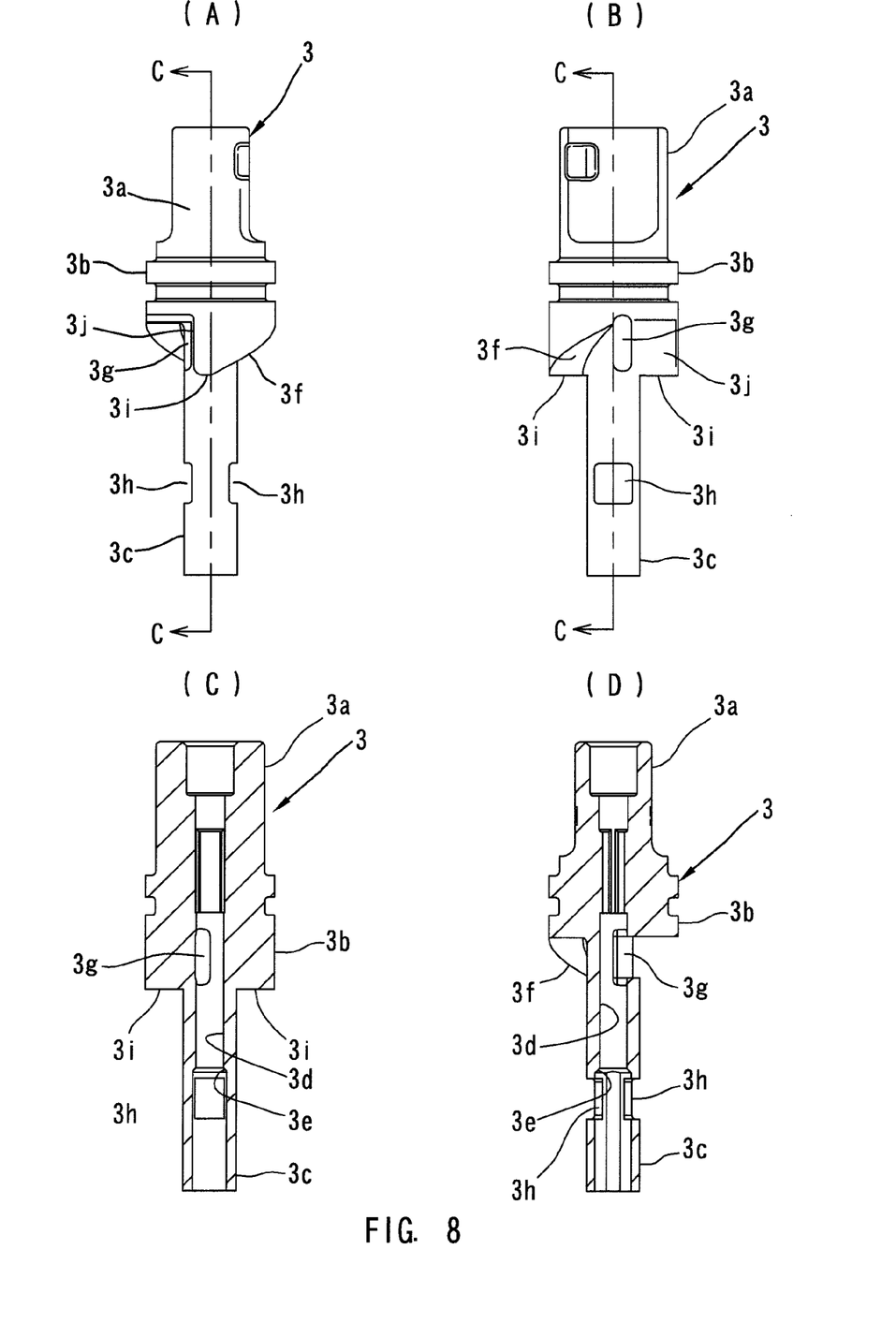
FIG. 8 shows a rotor used in the embodiment.

When the toilet lid reaches the closed position, the rotor 3 is stopped at the closed position (first rotation position), and the piston 4 is stopped at the first position. While the piston 4 can be moved downward from the first position, the piston 4 will not be moved downward from the first position since the piston 4 is biased upward by the coil spring 9. The valve body 10 is located at the closed-valve position as shown in FIG. 6 immediately after the toilet lid reaches the closed position. However, when pressures in the first and the second chambers 6A, 6B become generally equal to each other with the passage of a predetermined amount of time after the toilet lid reaches the closed position, the valve body 10 is moved downward by its own weight and is stopped at the open-valve position. This returns the rotary damper 1 to an initial condition as shown in FIG. 3.

Although particular embodiments of the invention have been described above, it will be understood that various modifications may be made without departing from the scope of the invention described herein.

For example, in the above-described embodiment, the rotation range of the rotor 3 is widened by adopting the two arrangements: i.e., making the rotor 3 rotatable with respect to the piston 4 through the abutment angle; and making the piston 4 rotatable though the inclination angle. Instead of adopting both of these arrangements, adopting only one may serve the purpose.

Moreover, in a case where the piston 4 is rotatable between the initial position and the terminal position as in the above-described embodiment, the first and the second abutment surfaces 3j, 4h may be arranged to be abutted against each other when the rotor 3 is rotated to the second rotation position. In this case, the position of the rotor 3 when the rotor 3 is rotated with the piston 4 from the second rotation position in the opening direction (one direction) through the angle between the initial position and the terminal position is the third rotation position. The third rotation position may be arranged to coincide with the open position of the toilet lid or may be a position more to the front than the open position in the opening direction by the predetermined angle.

Moreover, in a case where the rotor 3 is rotatable from the second rotation position to the third rotation position with respect to the piston 4 in the initial position, the piston 4 may be made non-rotatable in the opening direction (one direction) from the initial position.

INDUSTRIAL APPLICABILITY

The damper apparatus according to the present invention may be used as a damper apparatus disposed between the toilet body and the toilet lid for controlling the rotation of the toilet lid in the closing direction to be rotated at low speed.

The invention claimed is:

1. A rotary damper comprising:
a damper body comprising a receiving hole formed therein, the receiving hole comprising an opening in one end thereof and comprising a bottom portion in the other end thereof;
a rotor disposed in the opening of the receiving hole in a rotatable but retained manner;
a piston disposed in a portion of the receiving hole between the rotor and the bottom portion such that the piston is rotatable and movable in a direction of an axis of the receiving hole;
a first stopper that prohibits rotation of the piston and causes the piston to be stopped at a predetermined initial position in a circumferential direction about the axis when the piston is located between a predetermined first position and a predetermined second position in the direction of the axis, the first stopper allowing the piston to be rotated between the initial position and a terminal position spaced from the initial position by a predetermined angle in one direction in the circumferential direction about the axis when the piston is located at the second position; and
a movement mechanism that causes the piston to be moved from the first position to the second position when the rotor is rotated in one direction from a predetermined first rotation position to a predetermined second rotation position and that causes the piston to be moved from the second position to the first position when the rotor is rotated in the other direction from the second rotation position to the first rotation position;
wherein the rotary damper further comprises a second stopper that prohibits the piston from being moved beyond the second position in a direction from the first position to the second position;
the movement mechanism comprises a biasing member and a cam mechanism, the biasing member biasing the piston from the first position toward the second position, the cam mechanism allowing the piston to be moved from the first position to the second position by the biasing member when the rotor is rotated in the one direction from the first rotation position to the second rotation position, the cam mechanism causing the piston to be moved from the second position to the first position against a biasing force of the biasing member when the rotor is rotated in the other direction from the second rotation position to the first rotation position;
the cam mechanism converts the biasing force of the biasing member acting on the piston into a rotationally biasing force that causes the rotor to be rotated from the first rotation position to the second rotation position while the piston is being moved from the first position to the second position, and the cam mechanism does not convert the biasing force into the rotationally biasing force when the piston is prohibited from being moved beyond the second position by the second stopper;
in a case where the piston is located at the second position, the rotor is not affected by the rotationally biasing force derived from the biasing member, the rotor is rotatable beyond the second rotation position, and the rotor is rotatable together with the piston through an angle between the initial position and the terminal position;
the biasing member biases the piston only in the direction of the axis such that the piston is moved from the first position to the second position,
wherein the rotor and the piston comprise abutment portions respectively formed therein, the abutment portions abutted against each other when the rotor reaches a third rotation position from the second rotation position by rotating with respect to the piston located at the second position and in the initial position, the third rotation position being spaced from the second rotation position in the one direction by a predetermined angle, and wherein the piston is rotated from the initial position to the terminal position according to the rotation of the rotor in the one direction after the abutment portions abutted against each other,
wherein the receiving hole is divided into a first chamber in the bottom portion side and a second chamber in the opening side by the piston,
wherein the first chamber and the second chamber are filled with a viscous fluid, wherein the piston comprises an insertion hole formed therein, the insertion hole penetrating the piston in a direction of an axis of the piston, wherein the rotor comprises a small-diameter portion that is rotatably and slidably inserted in the insertion hole, wherein the small-diameter portion comprises a passage hole, a first communication hole and a second communication hole formed therein, the passage hole extending in a direction of an axis of the small-diameter portion, the first communication hole communicating between the passage hole and the second chamber, and the second communication hole communicating between the passage hole and the first chamber, wherein the small-diameter portion comprises a valve seat and a valve body, the valve seat being formed between the first communication hole and the second communication hole in the passage hole, and the valve body being received slidably in the passage hole, wherein the valve body is movable between a closed-valve position, wherein the valve body is seated on the valve seat, and an open-valve position wherein the valve body is spaced from the valve seat, wherein the valve body is configured to be moved toward the open-valve position by the viscous fluid flowed into the passage hole from the second chamber through the first communication hole when the rotor is rotated in the one direction for the piston to be moved from the first position to the second position, and wherein the valve body is configured to be moved toward the closed-valve position by the viscous fluid flowed into the passage hole from the first chamber through the second communication hole when the rotor is rotated in the other direction for the piston to be moved from the second position to the first position.

* * * * *